July 17, 1951 H. J. FINDLEY 2,560,940
ELECTROMAGNETIC DRIVE APPARATUS
Filed Jan. 7, 1948
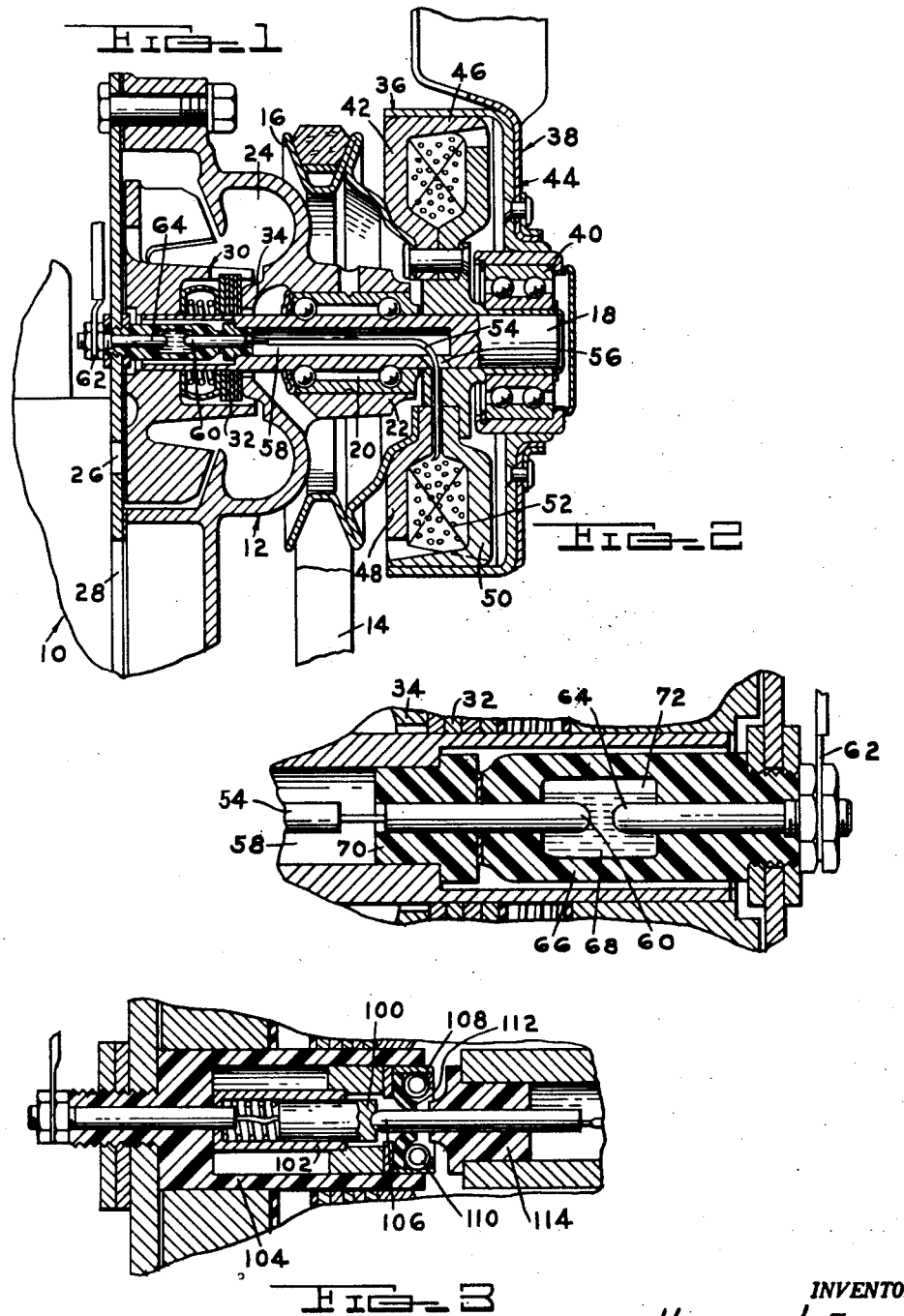
INVENTOR.
HOWARD J. FINDLEY
BY
*McDonald & Feagus*
ATTORNEYS Patented July 17, 1951

2,560,940

UNITED STATES PATENT OFFICE 2,560,940

ELECTROMAGNETIC DRIVE APPARATUS

Howard J. Findley, Chardon, Ohio, assignor to Eaton Manufacturing Company, Cleveland, Ohio, a corporation of Ohio Application January 7, 1948, Serial No. 1,037

5 Claims. (Cl. 172—284)

This invention relates to eddy current electromagnetic drives or power transmitting devices and more particularly to structural features thereof as applied to the driving of engine cooling fans or the like.

Broadly the invention comprehends the provision of an eddy current electromagnetic drive for controlling the speed of operation of an air circulating fan for a liquid cooled internal combustion engine wherein the fan is associated with the liquid circulating means of the engine and the liquid circulating means and electromagnetic drive have a common driving source of power. The liquid circulating means, electromagnetic drive and circulating fan are so structurally incorporated relative to one another in a compact, efficient arrangement with the current carrying brush for the drive arranged in the liquid circulating system of the engine.

An object of the invention is the provision of an incorporated engine air circulating fan and liquid circulating pump structure wherein the fan is speed controlled driven by an eddy current electromagnetic drive which has current transmitting means therefor situated axially of the pump in a portion of the liquid circulating system of the engine.

Another object of the invention is the provision of an eddy current electromagnetic power transmitting device for an engine fan for controlling the speed of operation thereof having the current supply brush thereof arranged axially of the drive in substantially sealed relation within a portion of the liquid cooling system of the engine.

A further object of the invention is the provision of an electromagnetic speed controllable transmitting mechanism for driving an engine air circulating fan structurally incorporated with the engine liquid circulating pump wherein the current carrying means for the mechanism is arranged in sealed relation in the water jacket of the pump.

A further object of the invention is the provision of an efficient, compact structural arrangement of engine air circulating fan and liquid circulating pump driven from an output shaft of the engine and wherein the operation of the engine fan is controlled by an eddy current electromagnetic power transmitting mechanism interposed between the output shaft and fan.

A yet further object of the invention is the provision of an eddy electromagnetic power transmitting mechanism comprising an input member, an output member, an electromagnetic coil arranged on one of the members and electrical supply circuit means for the coil having the current transmitting means thereof arranged in substantially sealed relation within a liquid housing adapted to be associated with the mechanism.

A still further object of the invention is the provision of an electromagnetic power transmitting mechanism, arranged in association with a liquid carrying housing, comprising a power actuated member, an associated member driven thereby, an electromagnetic coil secured in one of the members, a source of electrical power for the coil, an electrical circuit for conveying the electrical power to the coil having relatively rotatable contacting current transmitting means arranged in sealed relation to the liquid in the housing.

Other objects and advantages of the invention will appear from the following description taken in connection with the drawings, forming a part of the specification, and in which:

Fig. 1 is a fragmentary partially cross-sectionalized view of a novel form of engine circulating fan and liquid circulating pump structure in association with an internal combustion engine;

Fig. 2 is an enlarged view of the current transmitting arrangement shown by Fig. 1 and;

Fig. 3 is a modification of the current transmitting means shown by Figs. 1 and 2.

It has become necessary in view of the adaptation of eddy current electromagnetic power transmitting mechanism to internal combustion engines for controlling the speed of operation of air circulating fans therefor to incorporate the mechanisms within the fan proper and the power input therefor. The structural relation of the electromagnetic mechanism to the fan becomes further significant when the liquid circulating pump for the engine forms a part of the general fan assembly thereby necessitating a compact and efficient structure to replace the conventional associated pump and fan assembly.

The present combined pump-fan assembly compares with conventional pump-fan assemblies in that the fan and pump derive their driving source from an output shaft of their associated engine by way of a belt drive connected to a drive shaft for the pump and fan. The electromagnetic power transmitting mechanism of the presently devised pump-fan assembly is of the general type disclosed by my co-pending U. S. App. S. N. 693,061, filed August 26, 1946, now Patent No. 2,497,402, dated August 24, 1949, interposed between the pump drive shaft and fan assembly for controlling the operational speed of the fan in accordance with engine cooling requirements. As a means of carrying out the compact arrangement of structural relation between the pump, fan and power transmitting mechanism it was found most practical, for the purpose of supplying electrical current to the electromagnetic coil of the power transmitting mechanism, to arrange the current carrying brush along the axis of the pump-fan drive shaft in current contacting relative rotative relation within the liquid housing of the pump. With the arrangement of the current carrying and transmitting means within the liquid housing, for compact structure purposes, it becomes necessary to completely seal the current transmitting terminals from association with the liquid in the housing so as to minimize electrolytic action that might otherwise occur upon the terminals through the delivery of current requirements of the associated electromagnetic coils.

As an alternative to the completely sealed brush contact arrangement a current transmitting structure is provided comprising a small quantity of mercury or a like substance shielded in a container into which are projected, in contact with the mercury, current conducting members. The terminal of the rotative current conducting members should be so constructed relative to the mercury container as to restrain to a minimum the amount of liquid entering the mercury container.

Referring to the drawings for more specific details of the invention wherein like numerals refer to like parts and more particularly to Fig. 1, 10 represents generally an internal combustion engine having incorporated therein a combination pump-fan structure 12 which is driven from the crank shaft of the vehicle, not shown, by way of a belt drive 14 arranged between a pulley mounted on the crankshaft and a pulley 16 incorporated in the pump-fan structure.

The pump-fan structure 12 comprises a central shaft 18 journalled on bearing 20 which in turn is mounted in a housing member 22. The housing member 22 is suitably secured upon the engine 10 on the forward end thereof and provides therein a liquid pump chamber 24 having suitable inlet and discharge ports 26 and 28 respectively associated therewith and adapted to also be in communication with the liquid passages in the engine cooling system, not shown.

A pump 30 suitably affixed on the shaft 20 for rotation therewith is arranged in the pumping chamber and has suitable liquid sealing means 32 arranged on one end thereof in association with a hub portion 34 of the housing to inhibit leakage of liquid from the chamber along the shaft.

An eddy current electromagnetic power transmitting mechanism 36, of the type more fully disclosed by my co-pending U. S. App. S. N. 693,061 filed August 26, 1946, is arranged intermediate the driven pulley 16 and an air circulating fan 38 suitably journalled on bearing 40 which is mounted on shaft 20, as an effective speed control means for transmitting power from the crankshaft to the fan. The mechanism 36 comprises a rotor 42 fixedly secured to shaft 20 forward axially disposed from the pump 12 having the pulley 16 suitably secured to the hub thereof and extending outward radially axially in overhanging relation to the hub of housing 24 and a drum member 44 which is fixedly secured to the hub of fan 38 and is arranged with its axially extended portion 46 in radially spaced relation to the rotor 42.

The rotor 42 includes a pair of members 48 and 50 forming the field body of the power transmitting mechanism and having arranged annularly therebetween an electromagnetic coil 52. The coil 52 is grounded at one end to the members 48 and 50 and has its other end supplied with live current by way of lead line 54 extending radially through the hub of the rotor and axially through passages 56 and 58 provided in shaft 20, in insulated relation thereto terminating in a terminal member 60.

A source of electrical current for the coil is supplied by a current conveying line 62, from a source not shown, to a terminal member 64 arranged in axially spaced relation to the terminal member 60.

The terminal members 60 and 64 are mounted in a housing or container 66 of insulation material and are adapted to be immersed in mercury or a like substance 68 which is carried by the housing. The mercury together with the terminals 60 and 64 constitute the current transmitting means for the coil between the relatively rotating parts of the current supply line and line 54 connected to the coil. The rotating terminal 60 is securely arranged in an insulation sleeve 70, mounted in the pump-fan shaft and projects in close annular fitting relation into the housing 66 so as to minimize the amount of liquid entering the cavity 72 of the housing 66 from the pump chamber.

A small quantity of liquid in the mercury would not be particularly injurious to the terminals inas much as the greater portions thereof are completely immersed in mercury which operates as the current transmitting agent between the terminals and a small amount of leakage would not materially contaminate the mercury.

As a further means of protecting the current contacting brushes or transmitting mechanism from electrolytic action as regards the structure of Figs. 1 and 2, Fig. 3 illustrates an arrangement of a current supply contact 100 arranged for axial motion in a cage 102 mounted in a housing 104 of insulation material, and in axial juxtaposed relation with a rotating current receiving terminal 106. The housing 104 has secured in an open end 108 thereof an annular sealing member 110 having sealing lips 112 adapted to firmly embrace the exterior of terminal 106 and inhibit passage of liquid into housing 104. The terminal 106 is fixedly secured in an insulator sleeve 114 mounted in the pump shaft.

Although the invention has been described specifically relative to combination pump-fan assemblies for internal combustion engines it is applicable to any arrangement wherein current is supplied to an electromagnetic device having a liquid carrying housing or the like arranged in association therewith and through which the current for the device must be passed. Accordingly, the invention is to be limited only as indicated by the scope of the appended claims.

What I claim is:

1. An accessory drive apparatus comprising a liquid containing housing, a power driven shaft extending into the housing, an electromagnetic drive coupled to the shaft comprising an input member driven with the shaft, an output member cooperable therewith, and an electromagnetic coil carried by the input member, and an electrical supply circuit for the coil comprising a current conductor extending from the coil to a current contactor member fixedly secured in the shaft within the housing, a live current conductor extending from the electrical supply through the housing into contacting current transmitting relation with the coil contactor member, and means sealing the contacting portions of the conductors from the liquid in the housing.

2. An apparatus comprising a liquid containing housing, a rotatable power driven shaft extending partially into the liquid containing housing, an electromagnetic drive coupled to the shaft comprising an input member driven by the shaft, an output member cooperable therewith, and an electromagnetic coil carried by the input member, an electrical supply circuit for the coil comprising a current conductor extending from the coil through a central portion of the shaft and terminating in a terminal within the housing, a current conductor extending from the electrical supply through the housing and terminating in a terminal substantially axially aligned with the coil terminal within the housing, a container enclosing the ends of the terminals and a current conducting material in the container having the terminal ends immersed therein.

3. An electromagnetic power transmitting mechanism comprising a power supplied input member and a cooperable driven output member, an electromagnetic coil arranged on one of the members, a liquid carrying housing arranged in annular relation to a portion of one of the members, an electrical supply circuit for the coil comprising a source of electrical current, a stationary current conductor connected with the current supply terminating in a contactor terminal, a current conductor connected to the coil terminating at its free end in a contactor terminal axially spaced from the current contactor of the first conductor within the liquid carrying housing, said second conductor being rotatable with the member within which the coil is arranged, a stationary housing immersed in the liquid of the liquid carrying housing enclosing the contactor terminals substantially sealing the terminals from the liquid carrying housing and a substance in the terminal housing for transmitting current between the terminals.

4. An electromagnetic power transmitting mechanism comprising a power supply input member, a cooperable driven output member, an electromagnetic coil arranged on one of the members, a liquid carrying housing annularly disposed about a portion of one of the members and an electrical supply source for the coil comprising current supply means, a rotatable current conductor connected to the coil having a terminal at its free end, a stationary current conductor mounted on the housing connected to the current supply having a terminal on its free end axially spaced from the other terminal and current transmitting means comprising a stationary casing having a central cavity and embracing the respective conductors at axially spaced points, and a liquid in the cavity in contacting engagement with the respective conductor terminals arranged in sealed relation in the liquid carrying housing between the current conductor terminals.

5. An electromagnetic power transmitting mechanism comprising an input member and an output member cooperable therewith, an electromagnetic coil carried by one of the members, a source of electrical current for the coil, a liquid containing housing annularly disposed about a portion of one of the members, relatively rotatable electrical current transmitting means disposed intermediate the electrical current source and coil arranged in submerged relation to the liquid in the housing comprising axially spaced end terminals of the current supply and coil, a stationary container annularly disposed about the end terminals having a central cavity and a current conducting liquid therein with the terminal ends extending in immersed relation into the liquid in the cavity of the container.

HOWARD J. FINDLEY.

REFERENCES CITED

The following references are of record in the file of this patent:

UNITED STATES PATENTS

| Number | Name | Date |
| --- | --- | --- |
| 1,292,571 | Berst | Jan. 28, 1919 |
| 1,667,660 | Gehm | Apr. 24, 1928 |
| 1,685,498 | McCullouch | Sept. 25, 1928 |
| 2,224,439 | Lee | Dec. 10, 1940 |
| 2,255,420 | Graham | Sept. 9, 1941 |
| 2,386,505 | Puchy | Oct. 9, 1945 |
| 2,396,000 | Findley | Mar. 5, 1946 |
| 2,424,545 | Bard | July 29, 1947 |